May 19, 1959 L. C. FLETT 2,887,559
HEATING UNIT FOR PLATFORM MOUNTING
Filed Dec. 23, 1957 2 Sheets-Sheet 1
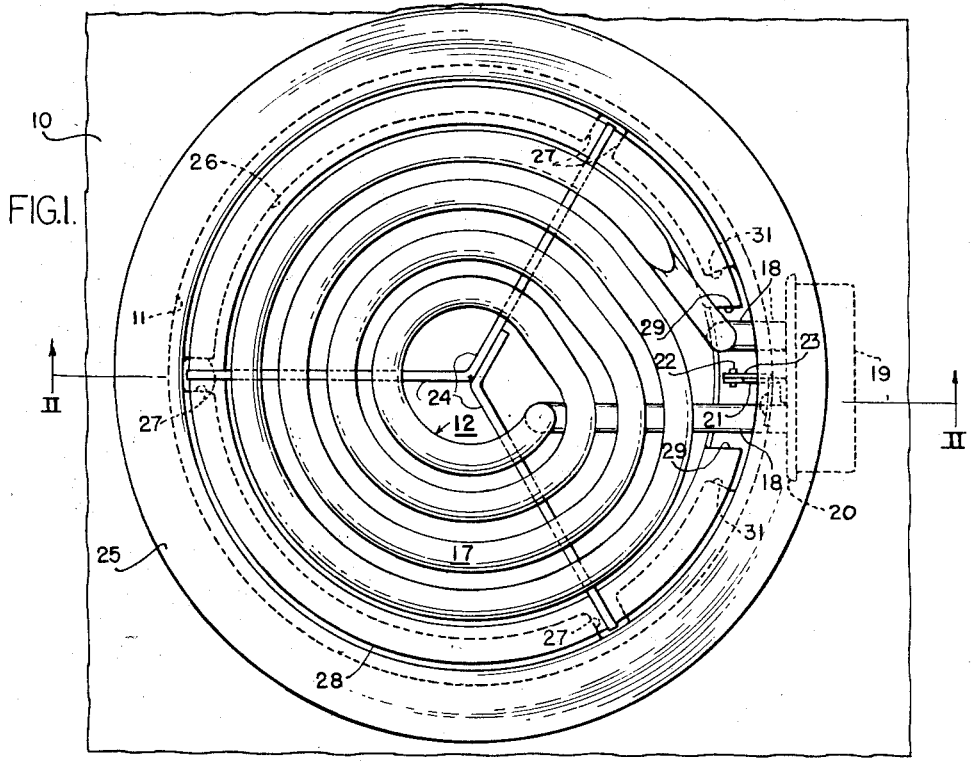
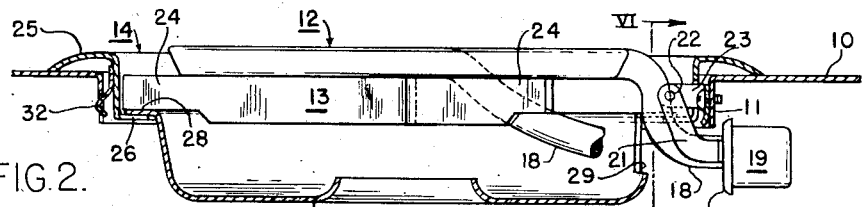
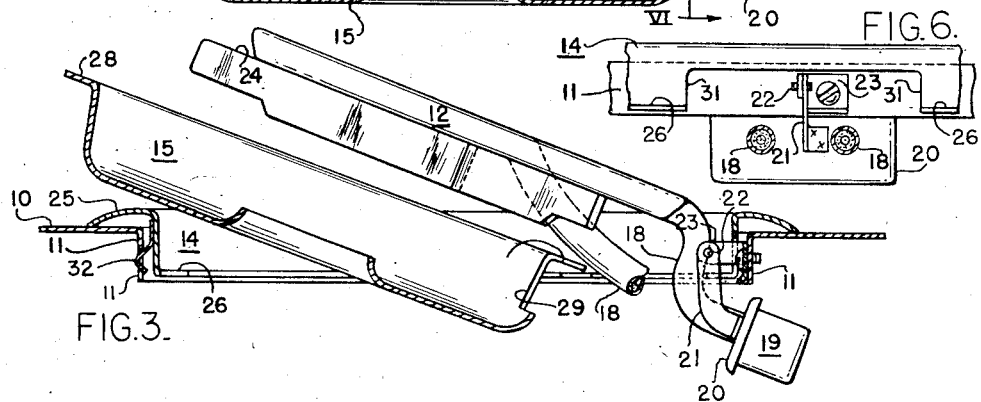
INVENTOR
LESTER C. FLETT
BY
ATTORNEY May 19, 1959

L. C. FLETT 2,887,559

HEATING UNIT FOR PLATFORM MOUNTING

Filed Dec. 23, 1957

INVENTOR
LESTER C. FLETT.
BY
ATTORNEY ial notation: $F_{(4, 25)}$...

United States Patent Office 2,887,559
Patented May 19, 1959

2,887,559

HEATING UNIT FOR PLATFORM MOUNTING

Lester C. Flett, Hamilton, Ontario, Canada, assignor, by mesne assignments, to Canadian Westinghouse Company, Ltd., Hamilton, Ontario, Canada Application December 23, 1957, Serial No. 704,394

4 Claims. (Cl. 219—37)

This invention relates to an electrically heated unit and drip pan construction for mounting in an opening in a range platform and has for an object to provide improved apparatus of this kind.

A further object of the invention is to facilitate the removal of the drip pan and the supporting ring of a range heating unit of the class set forth.

In practising one form of the invention, a sheathed resistance element, convoluted to form a flat, generally circular configuration, is employed for use in the opening of a range platform. The element is fixed to a supporting spider having radially extending arms terminating outwardly of the periphery of the element. Terminals of the sheathed element extend radially outwardly of the element beneath the platform and a pivoted support is provided for the element so that it may be swung upwardly and downwardly through the opening in the platform. A ring is provided extending through the platform opening and having an upper flange overlying the platform, peripherally of the opening, and a lower flange or ledge extending beneath the outer ends of the arms of the spider. Inwardly opening, radial slots are provided in the ledge in alignment with the arms of the spider. A drip pan is provided beneath the heating element and includes an outwardly extending horizontal rim which rests upon the ledge in the operating position of the element. The supporting arms of the element rest upon the rim of the pan.

The arrangement is such that the element may be swung upwardly about its pivot through the ring so that the drip pan may be readily removed from the ledge. The element may then be swung downwardly beneath the platform, the arms of the spider passing through the slots in the ledge. Accordingly, the ring is rendered accessible and may be easily removed from the opening in the platform for cleaning of the ring and the region of the platform about the periphery of the opening. The various elements are readily assembled to the platform in reverse order.

The foregoing and other objects are effected by the invention as will be apparent from the following description and claims taken in connection with the accompanying drawings, forming a part of this application, in which:

Fig. 1 is a plan view of a heating unit constructed and arranged in accordance with the invention and assembled to a range platform.

Fig. 2 is a section viewed from the plane II—II of Fig. 1 with portions of the structure shown in elevation.

Fig. 3 is a section, similar to Fig. 2, showing the heating element and drip pan moved upwardly.

Fig. 6 is a section taken along the line VI—VI of Fig. 2.

Figure 5:
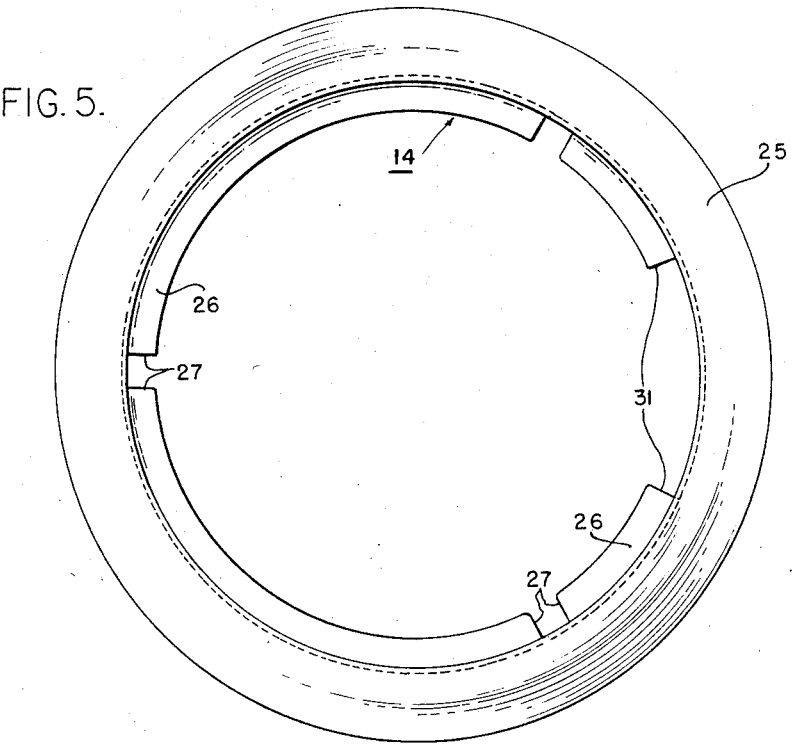
Fig. 5 is a plan of the removable ring shown in Figs. 1 to 4, inclusive.

Referring now to the drawings, a heating unit, constructed and arranged in accordance with the invention, is shown applied to a range platform indicated at 10 and having a depending collar 11 formed thereon and encompassing an opening in which the heating unit is disposed. The heating unit includes, generally, a sheathed heating element 12 having a plurality of supporting arms 13 defining a spider suitably secured to the underside of the element 12. The unit also includes a supporting ring 14 and a drip pan, indicated at 15, beneath the element 12 for the collection of liquid which might drip from the element.

The heating element 12 is formed of a sheathed heater 17 convoluted to form a relatively flat, generally circular element, as best shown in Figs. 1 and 2. The terminal portions 18 of the heater are suitably secured to a shield 20 as, by welding, which shield supports the usual terminal block shown at 19. The shield 20 is provided with an arm 21 that extends upwardly, as shown at Fig. 2, and is carried by a pin 22, the latter being supported by a suitable bracket 23 screwed or otherwise secured to the depending collar 11. The arrangement is such that the heating element 12 may be swung upwardly and downwardly with respect to the platform 10 about the pivot 22.

The spider 13 consists of a trio of arms 24 which extend from the center of the element radially outwardly beyond the outer periphery of the element 12 as shown in Figs. 1 and 2. The arms 24 are suitably secured to the underside of the element 17 as, for example, by welding.

The ring 14 extends within the collar 11 and has an upper flange portion 25 which overlies and rests upon the platform 10. The bottom of the ring 14 is provided with an inwardly extending, generally horizontal flange or ledge 26 having a trio of open slots 27 aligned with the outer ends of the respective arms 24, as best shown in Fig. 1. The drip pan 15 has an outwardly extending, generally horizontal rim 28 formed on the upper side thereof and resting upon the ledge 26 for the support of the arms 24 of the heating element in the operating position of the apparatus. The drip pan 15 may be open at its center, as shown, for the passage of air upwardly through the element and is also provided at one side with a recess 29 for accommodating the terminal portions 18 of the heater. In this connection, a portion of the ledge 26 may be omitted, as indicated at 31, for accommodating the terminals 18 of the element and the arm 21.

Figure 4:
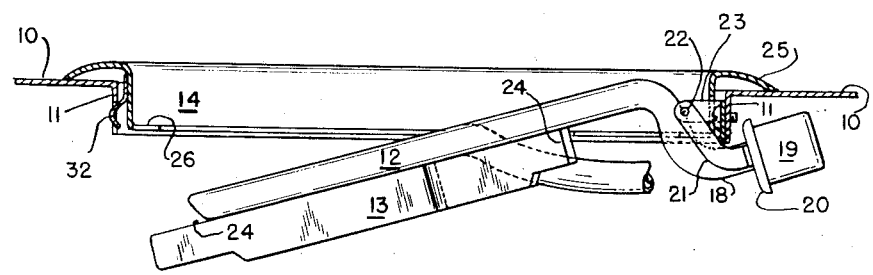
Fig. 4 is a section similar to Fig. 2 with the element swung downwardly.

The active position of the apparatus is shown in Fig. 2 wherein the arms 24 of the heating element rest upon the rim 28 of the drip pan, which rim 28 is supported by the ledge 26 of the ring 14. Preferably, the ring 14 is retained in position within the depending collar 11 by one or more springs 32 secured to the ring 14 as by welding, and disposed in suitable notches formed in the collar 11. The pan 15 is removed merely by raising the element 12 as shown in Fig. 3 whereupon the pan 24 may be grasped and removed from beneath the element. The element 12 may then be swung to its lower position as shown in Fig. 4, the ends of the arms 24 passing through the slots 27 at this time. With the element in the position shown in Fig. 4, the ring 14 may be readily grasped and disengaged from the platform 10 in opposition to the bias of the springs 32. The ring and pan may be readily cleaned as well as the portion of the platform 10 usually covered by the ring 14 which may become soiled during cooking operations. It is believed obvious that the ring and pan may be assembled to the range platform in reverse order.

From the foregoing, it will be apparent that an improved heater and drip pan construction for a range platform is provided wherein the pan and supporting ring for the element may be readily removed for cleaning. It will also be noted that, during cleaning, the heating element is positioned below the opening in the platform 10 as shown in Fig. 4, so that it does not interfere with the cleaning of the platform adjacent the opening. The various elements of the unit are of simple construction and may be economically produced and serviced.

While the invention has been shown in but one form, it will be obvious to those skilled in the art that it is not so limited, but is susceptible of various changes and modifications without departing from the spirit thereof.

I claim:

1. In a heating unit for a range platform having an opening formed therein, the combination of an annular flange member aligned with said opening and having a plurality of circumferentially spaced slots formed therein, means supporting said flange member in spaced relation below the platform, a pan having an outwardly extending rim formed thereon and resting upon the flange, a heating element disposed within said platform opening and having a plurality of supporting arms resting upon said rim and aligned, respectively, with the circumferentially spaced slots of the flange, and means supporting said heating element for swinging upward movement thereof for the removal of the pan through said platform opening; said supporting means providing for downward swinging movement of the element below the platform, said supporting arms passing through the circumferentially spaced slots during such downward movement of the heating element.

2. In a heating unit for a range platform having an opening formed therein, the combination of a generally cylindrical wall extending downwardly from the platform adjacent the periphery of the opening and having a flange extending inwardly from adjacent the lower margin thereof in a generally horizontal plane, said flange having a plurality of circumferentially spaced, radial slots formed therein, a pan having an outwardly extending rim formed thereon and resting upon the flange, a heating element disposed within said platform opening and having a plurality of supporting arms resting upon said rim and aligned with the respective slots of the flange, and means pivotally supporting said element from the platform and affording upward movement thereof for the removal of the pan from said flange; said pivotal support providing for downward swinging movement of the element from the platform, said supporting arms passing through the radial slots during such downward movement of the element.

3. In a heating unit for a range platform having an opening formed therein, the combination of a ring arranged within said opening and having an outwardly extending flange resting upon the platform, said ring having an inwardly extending generally horizontal ledge spaced below the platform and provided with a plurality of circumferentially spaced slots, a drip pan having a rim resting on the ledge and overlying the slots, a heating element disposed within the ring and including a plurality of supporting arms resting upon said rim, said arms being aligned, respectively, with the circumferentially spaced slots, and means pivotally supporting said element and providing swinging upward movement thereof for the removal of the pan from the ledge, said pivotally supported means providing downward swinging movement of the heating element with the supporting arms thereof passing through said slots.

4. In a heating unit for a range platform having an opening formed therein, the combination of a sheathed heating element convoluted to form a flat, generally circular configuration with terminal portions extending radially outwardly thereof, a plurality of radial arms secured to the under side of the element, a ring extending through said opening and having a flange overlying the platform and an annular ledge in a plane spaced below the platform, said ledge having a plurality of open slots circumferentially spaced therein and aligned with said radial arms, means for removably supporting the ring from the platform, a drip pan having an outer rim overlying said ledge and supporting said radial arms of the heating element, said pan having a recess on one side thereof for receiving the terminal portions of the element and means carried by the platform for pivotally supporting the heating element adjacent said terminal portions thereof, said element being adapted for upward swinging movement for the removal of said pan and then for downward swinging movement with the radial arms passing through the slots in the ledge, whereby ready access to the ring is afforded.

References Cited in the file of this patent

UNITED STATES PATENTS

| | | |
|---|---|---|
| 2,571,274 | McOrlly | Oct. 16, 1951 |
| 2,633,524 | Smith | Mar. 31, 1953 |